UNITED STATES PATENT OFFICE.

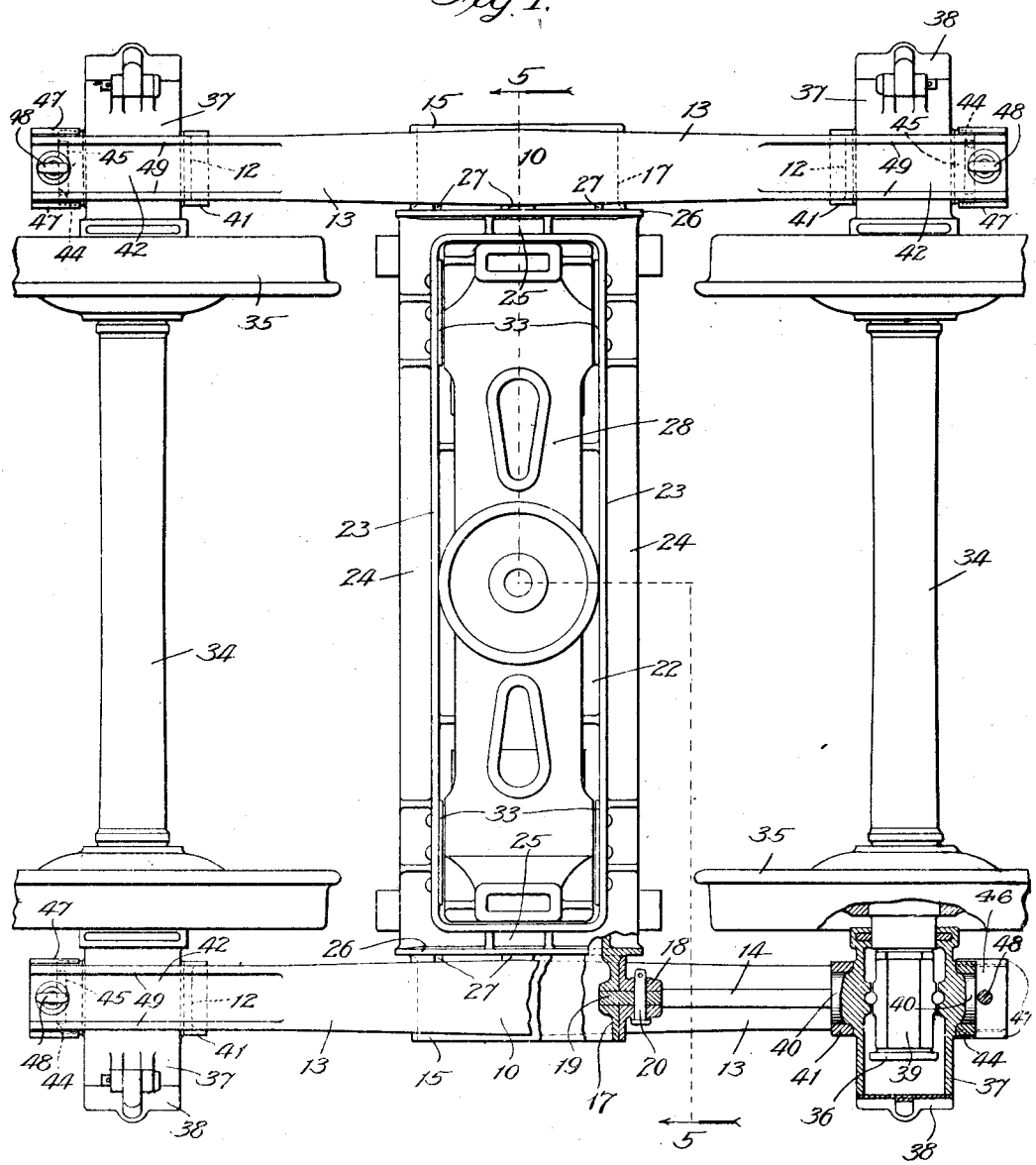

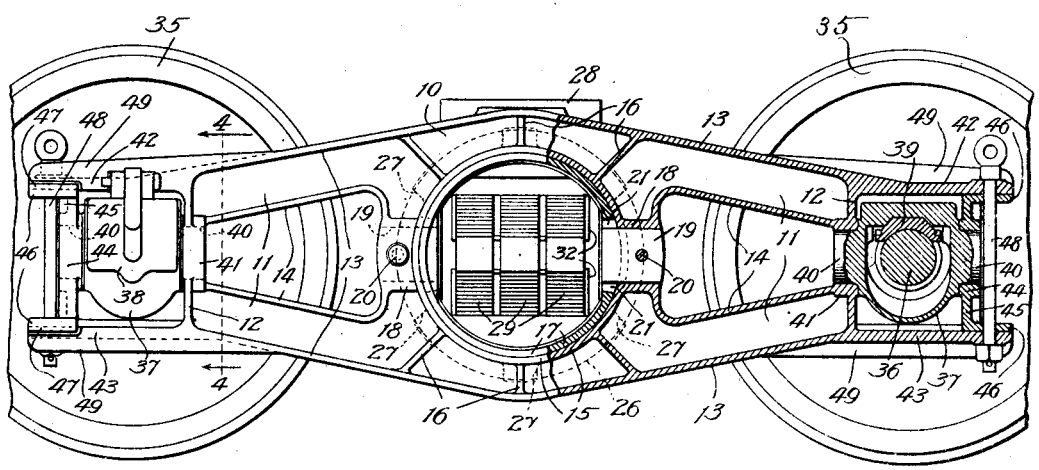
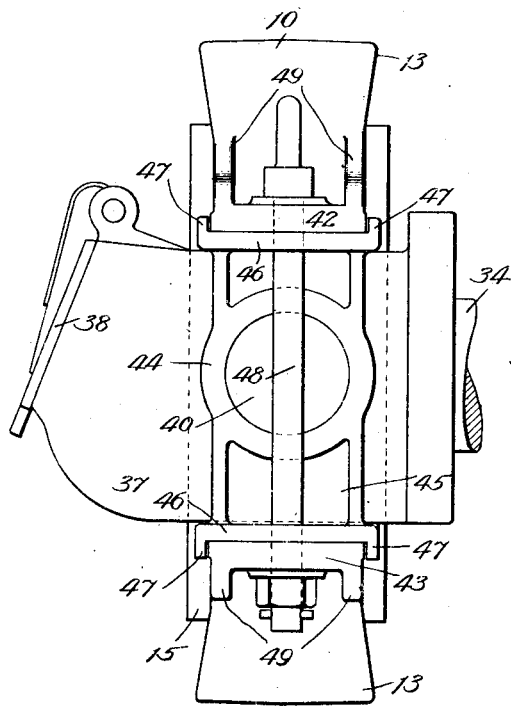
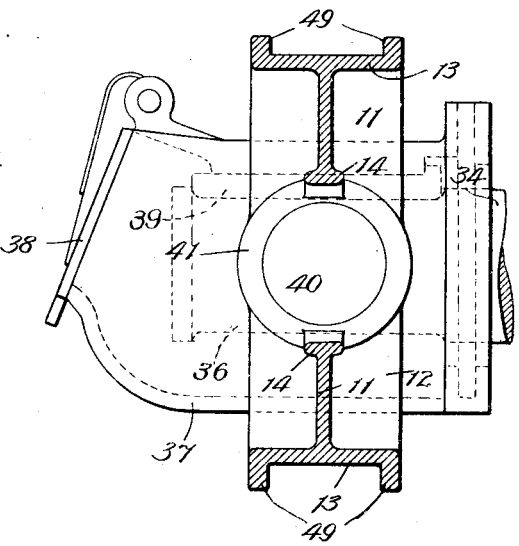

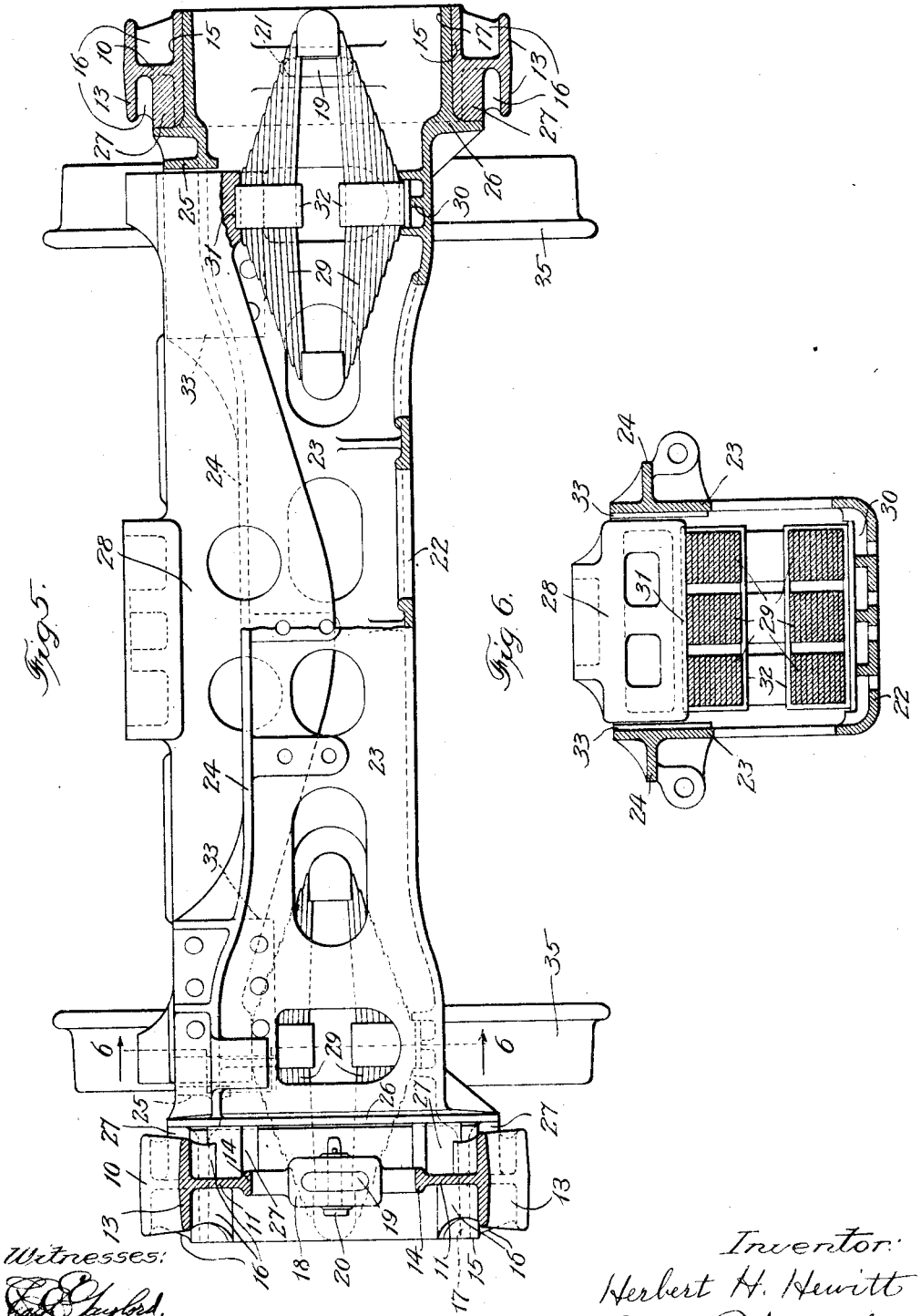

HERBERT H. HEWITT, OF BUFFALO, NEW YORK.

CAR-TRUCK.

1,072,723.

Specification of Letters Patent.   Patented Sept. 9, 1913.

Application filed May 8, 1912. Serial No. 696,024.

*To all whom it may concern:*

Be it known that I, HERBERT H. HEWITT, a citizen of the United States, and a resident of Buffalo, county of Erie, and State of New York, have invented certain new and useful Improvements in Car-Trucks, of which the following is a full, clear, and exact description.

The present invention relates to car trucks and more particularly to car trucks in which the construction permits the rocking movement of the side frames and wheel axles so that all of the wheels of the truck may rest solidly on the track, despite irregularities thereof and without straining or distorting the parts of the truck.

The present invention seeks to improve the construction of the car truck and of the journal boxes for the wheel axles, and the manner of mounting the boxes in the supports or side frames, and which construction permits the free rocking movement of the journal boxes so that the bearings will at all times be maintained properly in line with the car axles and journals thereof.

The invention consists in the features of improvement hereinafter set forth, illustrated in the preferred form in the accompanying drawings and more particularly pointed out in the appended claims.

In the drawings, Figure 1 is a plan view of the improved truck with the parts of one of the side frames and one of the journal boxes shown in horizontal section. Fig. 2 is a view partly in elevation and partly in vertical section through the side frames of the truck and the journal box mounted thereon. Fig. 3 is an end view of the side frame and journal box. Fig. 4 is a cross-section on the line 4—4 of Fig. 2. Fig. 5 is a cross-section of the truck taken on the line 5—5 of Fig. 1. Fig. 6 is a detail section on the line 6—6 of Fig. 5.

The side frames of the construction shown are provided with large central bearings by which they are swiveled to the transverse connecting means of the truck to rock in vertical planes. Each side frame is of diamond shape in outline and comprises an enlarged central portion 10 and opposite pairs of inclined, converging arms 11 which extend from the upper and lower part of the central portion of the side frame and which are connected at their outer ends by vertical end flanges 12. These parts are preferably made of an integral casting and comprise a central web having wide outer marginal flanges 13 and narrow inner marginal flanges 14. The flanges 13 and 14 merge into the end flanges 12. The central portion of the side frame is provided with a transverse circular opening having an edge flange which, like the flanges 13 and 14, project upon opposite sides of the central web portion of the side frame and forms an enlarged, transverse, cylindrical bearing 15. Preferably, as shown, the cylindrical bearing flange 15 is slightly wider than the outer edge flanges 14 and is connected thereto by diagonal, bracing flanges 16.

The transverse connecting means between the side frames is provided with cylindrical end members or trunnions 17 which are journaled within the cylindrical bearings 15 of the side frames to permit the vertical rocking movement of the latter. On opposite sides of the cylindrical bearing 15, the side frame is provided with enlarged bosses 18 having pockets therein for receiving keys 19. The keys are detachably held in the pockets by pins 20 and the inner ends of the keys extend through elongated slots 21 in the cylindrical members 17. The side frames are thus detachably connected to the members 17, but are free to rock to a limited extent thereon, since the length of the slots 21 is greater than the width of the keys 18.

In the preferred construction shown, the hollow cylindrical members or trunnions 17 are formed upon the ends of a truck transom. The transom is preferably formed of a single steel casting, is U-shaped in section and comprises bottom and side walls 22 and 23. The side walls are provided with strengthening flanges 24 adjacent their upper edges and are connected at their ends by portions 25. The cylindrical members or trunnions 17 are formed integral upon the ends of the transom and the latter is provided with a large circular flange 26 at the inner end of each trunnion which has a bearing upon thickened portions or bosses 27 formed upon the side frame at the inner end of the cylindrical bearing 15 thereof.

The truck bolster 28 which carries the center and side bearings of the truck, fits between the sides 23 and the end portions 25 of the transom and is supported at its ends by sets of elliptical springs 29. The bottom wall 22 of the transom and the ends of the bolster are provided with suitable seating portions 30 and 31 which engage the bands 32 that surround the leaves of the elliptical springs. The cylindrical members or trunnions 17 are hollow and open into the space within the transom and the ends of the springs 29 extend within these hollow cylindrical members or trunnions, as shown in Fig. 5. Bearing guide plates 33 are fixed to the inner faces of the sides 23 of the transom and are arranged to engage the ends of the bolster and hold the latter in position.

The wheel axles 34 of the truck are provided with wheels 35 fixed thereto and with projecting end journals 36 arranged within journal boxes 37. The general form of the journal boxes is similar to that prescribed by the Master Car Builders' Association, each being formed of an integral body of metal. Each box is provided with a suitable lid 38 and with a bearing or brass 39 for the journal 36 of the car axle. In the present construction, however, the use of a key or wedge for holding the brass 39 in place is dispensed with, the upper portion of the box being thickened and provided with a seat adapted to receive the brass. The journal box is mounted to rock transversely with respect to the side frame of the truck and by reason of this rocking movement the journal bearing or brass can be inserted and removed without employing the usual key.

In the construction shown in an application for car trucks filed by me in the United States Patent Office December 8, 1911, Serial No. 664,634, the journal boxes were arranged outside of the ends of the side frames and were provided on their inner sides with long inwardly extending trunnions having bearings at the inner and outer portions of the side frames. In the present construction, the box is provided on its opposite sides with short trunnions 40 which are preferably formed integral with the side walls of the box and are of quite large diameter. The inner trunnions of the boxes are journaled within enlarged hub portions 41 formed in the end webs 12 of the side frame. Each end of the side frame is provided with upper and lower, integral extensions 42 and 43 which project outwardly above and below the journal box and the outer trunnion of each box is journaled in the enlarged central portion 44 of an upright member 45 which extends between the outer ends of these extensions. The uprights 45 preferably fit between the ends of the extensions 42 and 43 and are provided at their upper and lower ends with out-turned flanges 46 having projecting lips 47 which overlap the edges of the extensions to hold the uprights against twisting. A bolt 48 extends through the flanges 46 and through the ends of the extensions to secure the upright 45 and journal box in position.

By removing the bolt, the upright and the journal box may be removed for repairs, renewals or the like.

The extensions 42 and 43 are preferably somewhat thicker than the marginal flanges 13 of the arms 11 and the outer faces thereof merge into the outer faces of the marginal flanges. The lower extension 43 is arranged opposite the end of the lower marginal flange 13, while the upper extension 42 is somewhat below the end of the upper marginal flange, so that a thickened body of metal is provided between the inner end of the upper extension and the upper arm 11 of the side frame. To further increase the strength of the extensions they are substantially channel-shaped and are provided with vertical flanges 49 at their edges which, like the upper faces thereof, merge into the marginal flanges 14. The edges of the lower flanges 49 are substantially horizontal, while those of the upper flanges are slightly inclined, as shown.

The construction is strong and rigid and at the same time the journal boxes are free to rock in transverse planes without distorting or straining any of the parts. In this way, the bearings of the journal boxes will always be maintained in proper alinement and in proper engagement with the car axle journals despite the transverse rocking movement of the wheel axles as the truck passes over irregularities in the track. Furthermore, inasmuch as the side frames can swing in vertical, longitudinal planes, the wheel axles are free to rock transversely and the wheels of the truck can at all times rest solidly upon the track in spite of any irregularities therein.

It should be noted that the journal boxes are arranged to rock within transverse openings at the ends of the side frames. The uprights 45 form the outer sides of such openings, the vertical flanges 12 of the side frame form the inner walls thereof and the frame extensions 42 and 43 form the upper and lower walls of the openings. Sufficient clearance is provided between these parts and the journal boxes to permit the free rocking movement of the latter.

While the improved manner of mounting the journal boxes in side frames is particularly advantageous in a construction in which the side frames are swiveled for independent rocking movement, it is obvious that this construction can be used to advantage in a car truck in which the side frames are not so swiveled.

It is further obvious that numerous changes may be made in the details set forth without departure from the essentials of the invention as defined by the claims.

I claim as my invention:—

1. In a car truck, the combination with a side frame, of journal boxes at the ends of said side frame, two trunnions arranged at opposite sides of each of said journal boxes for constantly holding the same against relative vertical movement upon the side frame, but permitting the transverse rocking movement of said journal boxes.

2. In a car truck, the combination with a side frame, and a journal box having laterally projecting trunnions integral with its opposite side walls, said side frame having members having circular bearings wherein said trunnions are journaled to constantly hold said box against relative vertical movement, but permitting the transverse rocking movement thereof.

3. In a car truck, the combination with a side frame provided with transverse openings at its ends having connected, vertical side walls, journal boxes arranged in said openings, and trunnions interposed between the side walls of said openings and of said journal boxes to constantly hold the latter against relative vertical movement, but permitting the transverse rocking movement thereof.

4. In a car truck, the combination with a side frame provided with transverse openings at its ends having connected side walls, journal boxes arranged in said openings and trunnions interposed between the side walls of said openings and of said boxes, the trunnions being fixed against vertical movement to one of said parts and the other of said parts having journal bearings for said trunnions, one of the side walls of each of said openings being removably secured in position to permit the removal of said journal boxes in longitudinal direction.

5. In a car truck, the combination with a side frame provided with transverse openings at its ends having top, bottom and opposite side walls, journal boxes arranged in said openings and trunnions having horizontal axes pivotally connecting the opposite side walls of said boxes to the side walls of said openings, the outer side walls of said openings being removably secured in position to permit the removal of said journal boxes in longitudinal direction.

6. In a car truck, the combination with a side frame, provided with transverse openings at its ends having top, bottom and opposite side walls, journal boxes arranged in said openings, laterally projecting trunnions integral with the opposite side walls of said boxes, and circular bearings in the side walls of said openings wherein said trunnions are journaled, the outer side walls of said openings being removably secured in position to permit the longitudinal removal of said journal boxes.

7. In a car truck, the combination of a side frame having upper and lower extensions at its ends, upright members removably secured to the ends of said extensions, and journal boxes arranged between said extensions and pivotally connected to the ends of said side frame and to said uprights.

8. In a car truck, the combination of a side frame comprising an enlarged central portion, converging side arms extending therefrom and end portions connecting said arms, said arms having upper and lower extensions projecting beyond said ends, upright members removably connected to said extensions, and journal boxes arranged between said extensions and having trunnions on their opposite side walls, said side frame ends and said removable upright members having bearings wherein said trunnions are journaled.

9. In a car truck, the combination of a side frame comprising an enlarged central portion, converging side portions and upper and lower end extensions, removable uprights between said extensions having flanges engaging the inner faces thereof, bolts extending through said flanges and said extensions for removably holding said uprights in position, and journal boxes mounted between said extensions inside of said uprights in a manner permitting the transverse rocking movement thereof.

10. In a car truck, the combination of a side frame comprising an enlarged central portion, converging side portions and upper and lower end extensions, uprights between said extensions having flanges and lips engaging the inner faces and edges of said extensions, a single bolt for removably holding each upright in place extending through the flanges thereof and through said extensions, and journal boxes arranged between said extensions and having trunnions journaled in bearings in said uprights and in the end of said side frame.

11. A side frame for car trucks having extensions at its ends, uprights removably secured between said extensions, the ends of said frame and said uprights having circular bearing openings for receiving side trunnions of a journal box.

12. A side frame for car trucks comprising an enlarged central portion having a transverse-cylindrical circular bearing and integral, converging side arms, connected at their ends, said arms having integral, upper and lower extensions, and upright members removably secured between the ends of said extensions.

13. A side frame for car trucks comprising an enlarged central portion having a transverse flanged opening, integral, flanged converging side arms and connecting flanges, said arms having integral, channel-shaped extensions, and flanged uprights fitted between and removably secured to the ends of said extensions, said end flanges and said uprights having bearings for receiving side trunnions of a journal box.

14. A car truck comprising side frames, a transverse member pivotally connected at its ends to the central portions of said side frames to permit the independent rocking movement of the latter, said side frames being provided with transverse openings at their ends having connected side walls, bearing boxes for receiving the journals of the wheel axles arranged in said openings, trunnions interposed between the opposite side walls of said openings and of said boxes, said trunnions being fixed to one of said parts and the other of said parts having bearings wherein said trunnions are journaled to hold said boxes against relative vertical movement on the side frames while permitting the transverse rocking movement thereof.

15. A car truck comprising side frames having central, transverse cylindrical bearings, transverse connecting means extending between said side frames and having end members journaled in said bearings, said side frames having upper and lower end extensions, uprights removably secured between said extensions, and journal boxes arranged between said extensions and having laterally projecting side trunnions, the ends of said side frames and said uprights having circular bearings wherein said trunnions are journaled to permit the transverse rocking movement of said boxes.

16. A car truck comprising side frames having central, transverse cylindrical bearing openings, a transom having a chambered body and hollow cylindrical end members opening into the chamber of said body and journaled in the openings of said side frames, a truck bolster arranged within the chambered body of said transom and elliptical springs arranged in the chambered body of said transom and beneath the ends of said bolster and projecting into said hollow end members.

HERBERT H. HEWITT.

Witnesses:
HARRY L. CLAPP,
KATHARINE GERLACH.